(12) United States Patent  
Jarliden et al.

(10) Patent No.: US 9,105,096 B2  
(45) Date of Patent: Aug. 11, 2015

(54) SCRIBBLE SEGMENTATION METHOD AND APPARATUS

(71) Applicant: Elekta AB (Publ), Stockholm (SE)

(72) Inventors: Andreas Eriksson Jarliden, Stockholm (SE); Marcus Lars Eric Hennix, Stockholm (SE)

(73) Assignee: Elekta AB, Stockholm (SE)

( * ) Notice: Subject to any disclaimer, the term of this patent is extended or adjusted under 35 U.S.C. 154(b) by 130 days.

(21) Appl. No.: 13/744,959

(22) Filed: Jan. 18, 2013

(65) Prior Publication Data

US 2013/0182955 A1 Jul. 18, 2013

Related U.S. Application Data

(62) Division of application No. 13/179,818, filed on Jul. 11, 2011, now abandoned.

(51) Int. Cl.
*G06K 9/00* (2006.01)
*G06T 7/00* (2006.01)

(52) U.S. Cl.
CPC ..... *G06T 7/0081* (2013.01); *G06T 2207/20016* (2013.01); *G06T 2207/20072* (2013.01); *G06T 2207/20101* (2013.01)

(58) Field of Classification Search
USPC ........................................ 382/173, 199, 219
See application file for complete search history.

(56) References Cited

U.S. PATENT DOCUMENTS

| 7,460,709 | B2 | 12/2008 | Grady |
| 7,697,756 | B2 | 4/2010 | Aharon et al. |
| 2005/0163375 | A1 | 7/2005 | Grady |
| 2006/0062457 | A1 | 3/2006 | Grady |

FOREIGN PATENT DOCUMENTS

| CN | 101034480 A | 9/2007 |
| CN | 101639935 A | 2/2010 |
| WO | WO-2009118021 A1 | 10/2009 |

OTHER PUBLICATIONS

Altas, Irfan, et al., "High accuracy solution of three-dimensional biharmonic equations," Numerical Algorithms, 2002, vol. 29.
Bai et al., "Distancecut: Interactive Segmentation and Matting of Images and Videos," Image Processing, 2007, ICIP 2007, IEEE International Conference on, IEEE, PI; Sep. 1, 2007, XP031157908, ISBN: 978-1-4244-1436-9.

(Continued)

*Primary Examiner* — Duy M Dang
(74) *Attorney, Agent, or Firm* — Finnegan, Henderson, Farabow, Garrett & Dunner, LLP (57) ABSTRACT

An apparatus and method of segmenting an image using scribble segmentation is provided. An image is segmented by constraining the membership value of a subset of image elements, solving a weighted biharmonic equation subject to the constrained membership values wherein the weights are determined from similarities between image elements, and determining the final segmentation based on the membership value of each image element. An image may also be segmented by constraining a membership value of a subset of image elements, determining the unknown membership values given the constraints by solving a linear equation system using a multigrid technique, and updating a coarser level of the multigrid hierarchy to account for additional constraints using patch matrices.

14 Claims, 5 Drawing Sheets

(56) References Cited

OTHER PUBLICATIONS

Boykov, Y. and Jolly, M., "Interactive graph cuts for optimal boundary & region segmentation of objects in N-D images," 2001, Proc. of ICCV, pp. 105-112.

Grady, Leo., "Random Walks for Image Segmentation," 11, 2006, IEEE Transactions on Pattern Analysis and Machine Intelligence, vol. 28, pp. 1768-1783.

Levin, A., et al, "Colorization using optimization," ACM Transactions on Graphics ACM USA, vol. 23, No. 3, Aug. 2004, pp. 689-694, XP002513948, ISSN: 0730-0301.

Shi, Jianbo, et al., "Normalized cuts and image segmentation," Computer Vision and Pattern Recognition, 1997, Proceedings, 1997 IEEE Computer Society Conference on San Juan, Puerto Rico Jun. 17-19, 1997, Los Alamitos, CA, USA, IEEE Comput. SOC, US, Jun. 17, 1997, pp. 731-737, XP010237433 ISBN: 978-08186-7822-6.

Singaraju, Dheeraj, et al., "P-Brush: Continuous Valued MRFs with Normed Pairwise Distributions for Image Segmentation," 8 pages, Published on 2009.

Wang et al., "An Iterative Optimization Approach for Unified Image Segmentation and Matting," Computer Vision, 2005. ICCV 2005, Tenth IEEE International Conference, Beijing, China Oct. 17-20, 2005, Piscataway, NJ, USA, IEEE, vol. 2, Oct. 17, 2005, pp. 936-943, XP010856918 ISBN: 978-0/7695-2334-7.

Wang, J., et al., "Linear Neighborhood Propagation and Its Applications," Sep. 9, 2009, IEEE Transactions on Pattern Analysis and Machine Intelligence, vol. 31, pp. 1600-1615.

Lombaert et al., "Geodesic Thin Plate Splines for Image Segmentation," 2010 20th International Conference on Pattern Recognition, Aug. 23, 2010, pp. 2234-2237.

Partial European Search Report for EP12175444.4 dated Oct. 22, 2012, 7 pages.

Vanek et al., "Algebraic Multigrid by Smoothed Aggregation for Second and Fourth Order Elliptic Problems," Sep. 1, 1996, vol. 56, No. 3, pp. 179-196.

Xue et al., "Geodesic Matting: A Framework for Fast Interactive Image and Video Segmentation and Matting," International Journal of Computer Vision, Apr. 1, 2009, vol. 82, No. 2, pp. 113-132.

Mihajlovic et al., "Efficient Parallel Solvers for the Biharmonic Equation," Parallel Computing, Elsevier Publishers, Jan. 1, 2004, vol. 30, No. 1, pp. 35-55.

Gundolf Haase, "Algebraic Multigrid with Local Support," XP055054653, Dec. 28, 1999, pp. 1-15, available at: http://citeseerx.ist.psu.edu/viewdoc/summary?doi=10.1.1.34.4215.

Extended European Search Report for EP12175444.4, Mar. 11, 2013.

Office Action, issued from the Chinese Patent Office in corresponding Chinese Patent Application No. 2012/10240168.7, dated Feb. 28, 2015, 15 pages (including English translation, 8 pages).

FIGURE 5

SCRIBBLE SEGMENTATION METHOD AND APPARATUS

CROSS-REFERENCE TO RELATED APPLICATIONS

This application is a divisional of U.S. patent application Ser. No. 13/179,818, filed Jul. 11, 2011, the disclosure of which is incorporated herein by reference in its entirety.

FIELD OF THE INVENTION

The present invention relates generally to image segmentation and, more specifically, to scribble segmentation methods and associated apparatuses.

BACKGROUND OF THE INVENTION

Segmentation is a known method of editing images and videos, used primarily for extracting and inserting an object from one image into another, and/or masking off certain areas of an image while performing adjustments. Segmentation of medical images is a common, but time consuming, task in the field of treatment planning. Segmenting targets and organs-at-risk is critical in treatment planning applications because the planning process depends, inter alia, on the accuracy of segmentation for the quality of its results.

Currently, there are many segmentation tools available that range from completely manual to fully automated. For purely manual segmentation methods, the user typically "outlines" or "paintbrushes" the structure. While this method gives the user complete control over the result, it is a very time consuming and tedious task. Additionally, the manual methods can produce large variations between different users. In that regard, automating the segmentation is very attractive in theory. However, automatic methods often relinquish significant control of the results from the user and often fail to produce correct or even satisfactory results. This forces the user to manually correct the results, if such corrections are even possible, which can be as time consuming as manually segmenting the structure from the start. If automatic methods provide any control of the end result, it is often via settings that have a very indirect effect on the result, making it difficult for the user to understand how to best adjust all the settings.

Semi-automatic methods are more realistic than fully automatic methods and quicker than manual methods. These methods greatly reduce the segmentation time while giving the user more direct control of the result. One family of such methods is the "scribble" segmentation method where the user annotates sonic pixels with a label, such as foreground or background, and the computer then determines the best labeling of all unlabeled pixels according to some set criteria. If the result is not satisfactory, the user labels additional pixels until the desired result is obtained.

What is needed is an improved semi-automatic method and system for segmenting images that has the advantages of an automatic method, while allowing users to have more direct control of the result.

SUMMARY OF THE INVENTION

The present invention provides methods and systems for segmenting a digitized image using a semi-automatic scribble segmentation method. In one aspect, the present invention provides a method for segmenting a digitized image by constraining the membership value of a subset of image elements, solving a weighted biharmonic equation subject to the constrained membership values wherein the weights are determined from similarities between image elements, and determining the final segmentation based on the membership value of each image element.

In some embodiments, the image elements may be pixels, whereas in other instances the image elements may be voxels. The constraints may be inside, outside and/or edge labels. In other embodiments, the biharmonic equation is solved using an algebraic multigrid technique. In yet another embodiment, the biharmonic equation is reformulated into a coupled problem and solved using multigrid techniques.

In another aspect, the invention provides a method for segmenting a digitized image by constraining a membership value of a subset of image elements, determining the unknown membership values given the constraints by solving a linear equation system using a multigrid technique, and updating a coarser level of the multigrid hierarchy to account for additional constraints using patch matrices.

In another aspect, the invention provides a system including a processor and memory devices for performing the methods described herein.

In another aspect, the invention provides software stored on a computer-readable medium that when executed by the computer performs the methods described herein.

BRIEF DESCRIPTION OF THE DRAWINGS

The foregoing and other objects, features, and advantages of the present invention, as well as the invention itself, will be more fully understood from the following description of various embodiments, when read together with the accompany drawings, in which.

DETAILED DESCRIPTION

Figure 1:
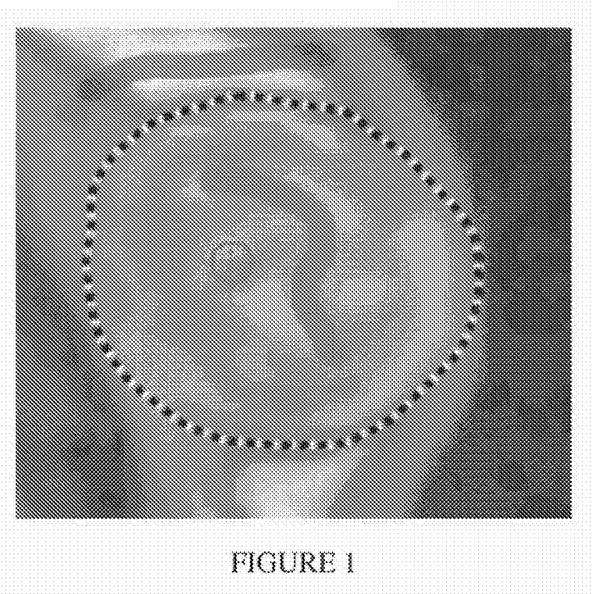
FIG. 1 is an example of segmenting an image using scribble segmentation.

The present invention relates to scribble segmentation methods for segmenting images. As shown in FIG. 1, a user annotates an image with different types of scribbles (e.g., two), each scribble representing a different constraint such as foreground/background or inside/outside. Thus, in an implementation using two types of scribbles, a first type of scribble is applied by the operator to denote a region of the image to be considered as part of the foreground, and a second type of scribble denotes a region of the image considered the background. Any number of scribbles of either type can be added if the operator feels it necessary to further constrain the result. In practice, the user may work on a two dimensional projection or a planar section from a three dimensional image, and the system then processes the three-dimensional image on the basis of the user's input. Accordingly, in this description the terms "pixel" and "voxel" will be used interchangeably.

Scribbles can be added by brush strokes applied via a human interface device (HID) such as a mouse or a stylus of a graphics tablet. Different types of scribble can be denoted by selecting a new mode via a graphical user interface, by using different controls on the HID such as the left and right mouse buttons, or on another HID such as a SHIFT key on a keyboard in combination with a mouse or stylus movement. Scribbles may be of any suitable shape chosen by the operator or may be simple point selections via single mouse clicks.

One way of implementing scribble segmentation is the Graph Cuts method, where each pixel in the image becomes a node in a graph. Edges are created between all neighboring nodes, and the edges are associated with a cost that is based on a specified property such as intensity similarity or color. Two special nodes are added to the graph representing the foreground and the background. Nodes representing pixels labeled as foreground or background by the user are connected to either the foreground or background node using infinite weights. To obtain the result, a mi-cut algorithm is used to partition the nodes as either being associated with the foreground node or the background node in such a way that the sum of the cut edges is minimized.

Another method is the Random Walker method, which treats the problem as a combinatorial Dirichlet problem and is solved through a large linear equation system. Using this approach, each pixel is associated with a potential, which is unknown except at pixels labeled by the user. Labeled pixels are then used to define Dirichlet boundary conditions constraining the potential, for example 0 for background and 1 for foreground. A solution is obtained by determining the potential subject to the boundary conditions so that it minimizes the Dirichlet integral $$D[u] = \frac{1}{2}\int_\Omega |\nabla u|^2 d\Omega \qquad \text{Equation (1)}$$

The minimum is obtained by solving the Laplace equation:

$$\nabla^2 u = 0 \qquad \text{Equation (2):}$$

subject to the boundary conditions. The solution to the Laplace equation is a harmonic function. In a discrete setting, the combinatorial formulation of the Dirichlet integral becomes $$D[u] = (Au)^T C(Au) u^T L u = \frac{1}{\sum w_{ij}(u_i - u_j)^2} \qquad \text{Equation (3)}$$

where the weights $w_{ij}$ are based upon similarities between nearby pixels. The similarities may be measured as intensities, color, grayscale, or other properties.

Figure 2A:
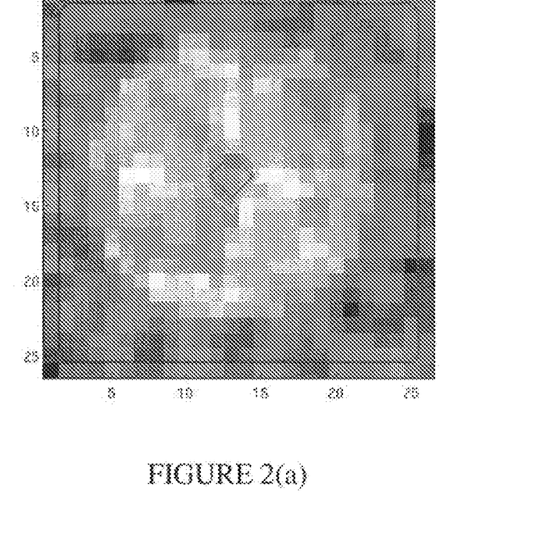
FIG. 2(a) is the result of a prior art method of segmentation and 2(b) is a graph showing the random walker potential for the segmentation in 2(a)

Extending this technique into three dimensions introduces certain challenges. While the Random Walker and Graph Cuts methods may be extended to three dimensions, the behavior becomes much worse than in two dimensions, producing unintuitive and often incorrect segmentations. One reason for the bad behavior in three dimensions is the so-called "shrinking bias" problem, in that instead of identifying a good, large cut between segments, the algorithm prefers a smaller, albeit less accurate cut. An example of this result is illustrated in FIG. 2(a). The effect of the shrinking bias in three dimensions is that the segmentation result only extends a short distance from the foreground labels instead of extending all the way out to the structure surface to segment.

Figure 2B:
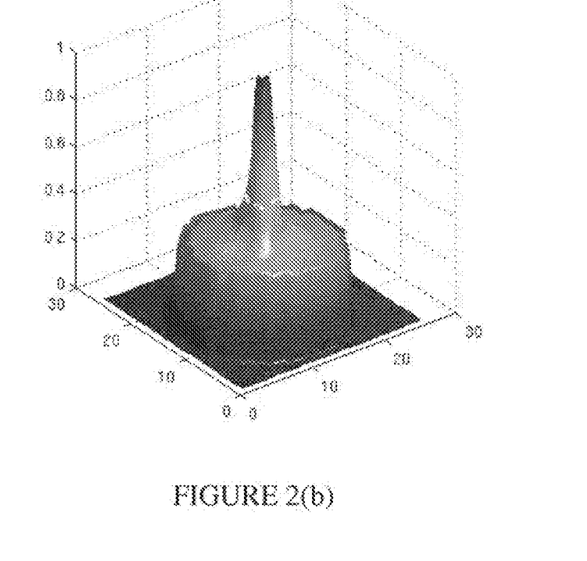

With Random Walker, there is no distinct cut as with Graph cuts but instead a gradual change in potential. To minimize the cost function that penalizes changes in the potential, the primary changes in potential should occur in areas with large changes in image intensity. These typically include edges, as they have a smaller "cost" associated with them. The shrinking bias, however, causes the potential to change rapidly in a small area in which there is no suggestion of image edges, because the smallness of the area makes up for the larger cost inside the area. This can be seen as the rapid fall-off in the potential in FIG. 2(b). The blue and red contours are the outside and inside labels, respectively, and the green the resulting segmentation. The shrinking bias becomes severe in three dimensions because the size of the cut grows faster than it does in two dimensions. For example, the cut needed for a two dimensional circle grows proportional to the radius, but for a three dimensional sphere it grows proportional to the square of the radius.

To solve the problem of the shrinking bias in three dimensions, one embodiment of the present invention uses a weighted biharmonic equation to solve for membership values. The mathematical formulation of the problem is changed to use a different cost function which results in a different behavior around the constraint points. Instead of minimizing the Dirichlet integral of Equation 1, the integral over the Laplacian is minimized according to Equation 4:

$$L[u] = \int_\Omega \nabla^2 u d\Omega. \qquad \text{Equation (4):}$$

While Equation 4 is syntactically very similar to Equation 1, the equations are fundamentally different. Equation 1 is the integral over the norm of the gradient of u, whereas equation 4 is the integral over the Lacplacian of u. This integral is minimized by the weighted biharmonic equation:

$$\nabla^4 u = 0 \qquad \text{Equation (5):}$$

And subject to boundary conditions. The integral may be discretized using finite differences to arrive at a discrete version consisting of a large sparse linear equation system generalized as Equation 6:

$$Bu = 0, \qquad \text{Equation (6):}$$

which is subject to the same boundary conditions as the random Walker method and where B is a matrix describing the biharmonic operator. Since a potential is by definition the solution of a Laplace equation, the obtained value is not a potential and therefore referred to as a "membership" value instead.

Figure 3A:
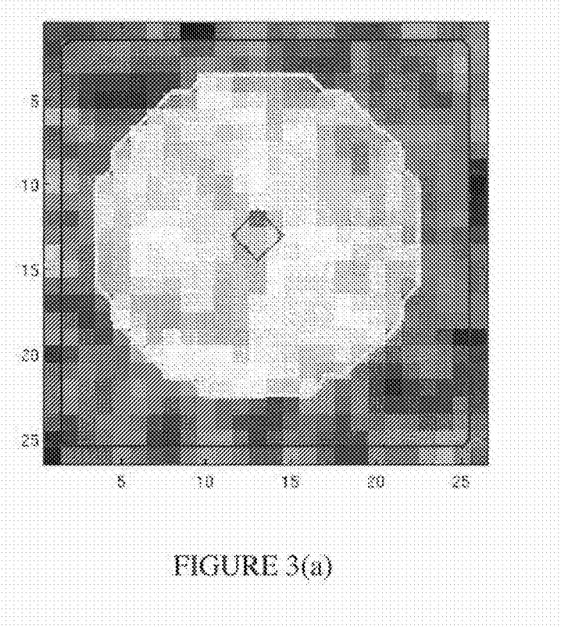
FIG. 3(a) is the result of a segmentation according to one embodiment of the invention and 3(b) is a graph showing the membership value for the segmentation in 3(a)
Figure 3B:
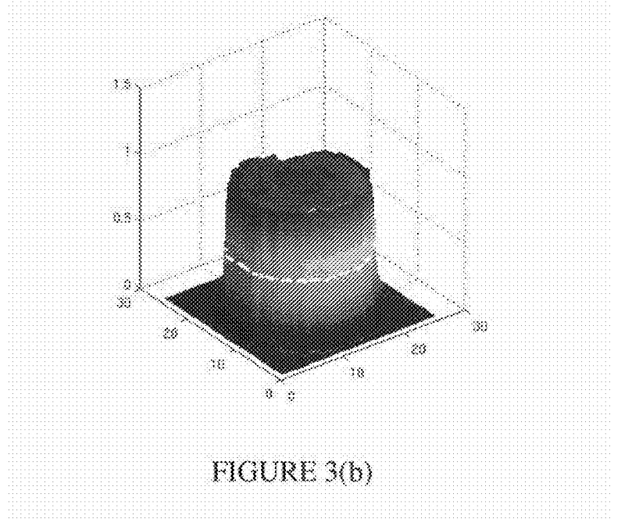

The change in behavior and how the rapid fall off problem is solved can be seen in FIGS. 3(a) and 3(b). The different behavior is especially noticeable around the middle constraint point when compared to FIGS. 2(a) and 2(b).

One challenge with implementing Biharmonic scribbles in three dimensions is the size of the linear equation system, which is problematic for an interactive, real-time system. Because one variable is assigned to each pixel, even a 100× 100×100 region has a million unknowns. In fact, the size of most three dimensional problems is so large that direct methods are infeasible, requiring iterative algorithms with very low computational complexity. At the same time, the solution method must handle strongly varying coefficients with boundary conditions at arbitrary pixels.

Accordingly, another embodiment of the invention uses an algebraic multigrid method to solve the scribble biharmonic equation. Multigrid methods address the slow convergence of regular iterative methods which are only effective on the high-frequency errors. The first few iterations in a regular iterative method quickly reduces the high-frequency error in the approximation, but eventually the error becomes low-frequency and progress becomes very slow. Multigrid addresses this problem by relaxing on multiple coarser levels of the problem with fewer unknowns because what is a low-frequency error on the finest level becomes high frequency on a coarse enough level. A restrictor transfers information from a fine level to the next coarser level, and an interpolator in the other direction. In addition to directly being used as the solution method, multigrid may be used as a preconditioner within an iterative method.

Trying to solve the biharmonic equation with a standard second-order differences stencil results in very slow convergence and relatively dense matrices even on simple homogeneous and isotropic biharmonic problems. On more complicated problems, it often results in divergence To get acceptable convergence, one embodiment of the invention introduces an extra variable v that is the Laplacian of the original variable u. The coupled problem is expressed as follows:

$$\nabla^4 u = 0 \Leftrightarrow \begin{cases} \nabla^2 v = 0 \\ v = \nabla^2 u \end{cases}$$ Equation (7)

This results in a system that has twice as many unknowns but with better numerical properties. Sometimes when there are boundary conditions on both u and v, the v portion can be completely decoupled from the u part. Thus the v portion can first be solved separately. Then the u portion is solved using the solution to the v portion. For the biharmonic scribble equation, however, the v portion cannot be decoupled. For unconstrained nodes, the u and v portions are coupled via $$\begin{cases} \nabla^2 v = 0 \\ v = \nabla^2 u, \end{cases}$$

but for constrained nodes they are instead coupled via $$\begin{cases} v = \nabla^2 u \\ u = C. \end{cases}$$

Using $v=\nabla^2 u$ is crucial since it is what maintains the coupling to the users constraints on U. Instead, using $\nabla^2 v=0$ would completely decouple the v part, making all the v values zero and reducing the biharmonic equation to a Laplace equation.

Because the weights are derived from the image, the weights are highly varying. This means that the interpolation and restriction must be tailored around each node to ensure convergence, unlike in regular multigrid where the interpolation and restrictor is kept constant.

For the highly varying weights, it is not sufficient to only adapt the interpolation and restriction. The selection of which nodes to keep on the coarser levels must also be determined based on the weights unlike with regular multigrid where coarse nodes are selected using a constant pattern, such as a checkerboard pattern that keeps every second node. Not selecting the coarse nodes based upon the weights can lead to poor convergence or even divergence.

Solving large equation systems can be very time consuming, especially in three dimensions where the systems become very large. Although multigrid methods are very fast solvers, the setup time to construct the hierarchy of matrices needed can be significantly longer than the time to run the multigrid solver. For scribble methods, this is problematic since the setup must be redone every time the user modifies or adds a new label.

Accordingly, another embodiment of the invention uses a multigrid method with patch matrices to solve large equation systems. As described previously, the multigrid technique may be used to solve the equation system on multiple levels. From the original problem, a series of equation systems with fewer and fewer unknowns are created that approximates the original problem. An iterative approach may then be used to solve the pyramid of equation systems, the principle being that only a few iterations are needed on the original level (which requires the most computations) to fine-tune the solution from the coarser levels.

For the original problem, the grid $\Omega_h$ is the grid of all the pixels and the system represented by $$A_h x_h = f_h$$ Equation (8):

where $x_h$ is the potential (with the Random Walker method) or membership value (with Biharmonic Scribbles) for each pixel. Typically, all pixels with $x_h > \frac{1}{2}$ are labeled with a first label, such as foreground, for a simple two label segmentation. The value of $f_h$ is usually zero for all unconstrained values, which are the unlabeled pixels. Without multigrid, the solution method solves for $x_h$ directly.

Figure 4:
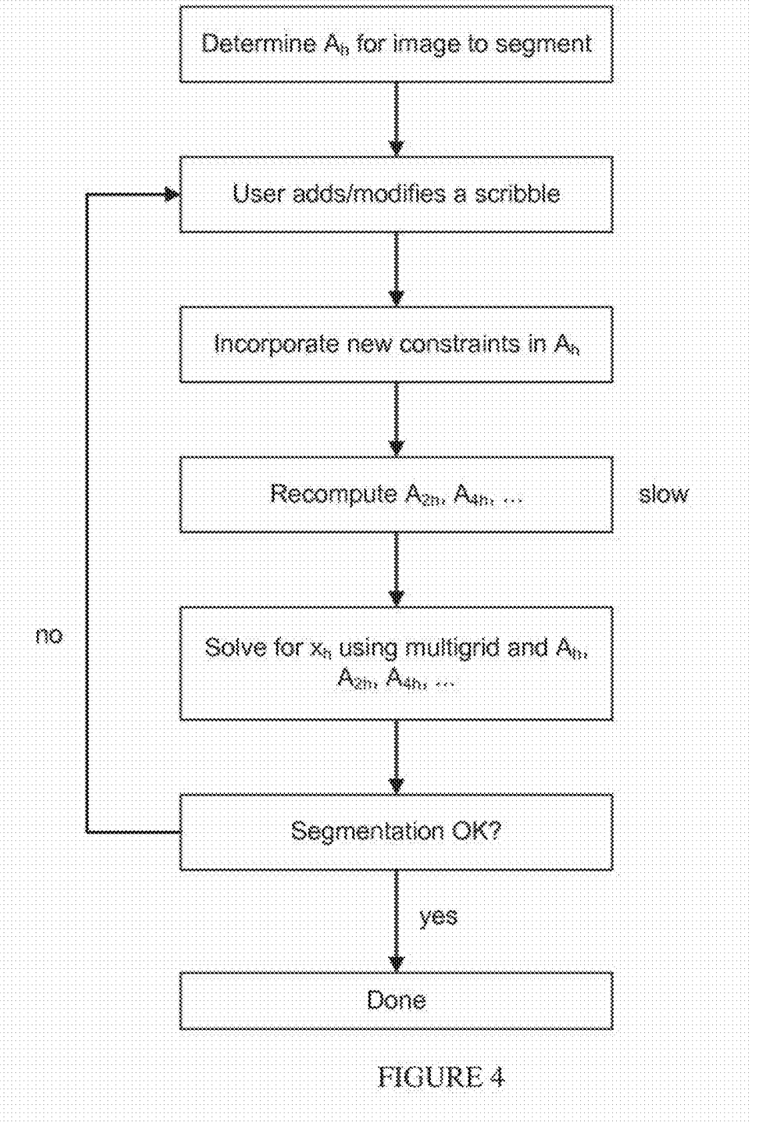
FIG. 4 is a flow chart depicting a prior art method of scribble segmentation a using multigrid technique.

Using the multigrid approach, a series of grids labeled as $\Omega_{2h}$, $\Omega_{4h}$, and so on are constructed with each being coarser than the previous grids. The 2h notation signifies that the distance between grid points is typically twice that of the finer grid with normal geometric multigrid, where a coarser grid typically consists of every second grid point of the finer grid in each direction. A restrictor $I_h^{2h}$ transfers vectors from $\Omega_h$ to $\Omega_{2h}$ by the following $$x_{2h} = I_h^{2h} x_h$$ Equation (9):

And an interpolator (or prolongator) $I_{2h}^h$ transfers vectors in the opposite direction by the following $$x_{2h} = I_{2h}^h x_{2h}$$ Equation (10):

The matrix $A_{2h}$ is computed from $A_h$ using the Galerkin property $$A_{2h} = I_h^{2h} A_h I_{2h}^h$$ Equation (11):

And similarly $A_{4h}$ is computed from $A_{2h}$ and so on $$A_{4h} = I_{2h}^{4h} A_{2h} I_{4h}^{2h}$$ Equation (12):

When the user adds new labels, such as through a new scribble, the boundary conditions generated by the new labels are incorporated by modifying $A_h$ and $f_h$. A new $A_{2h}$ is then computed as shown above using the new $A_h$ and so on. Since each level requires two matrix multiplications, there may be a significant delay before any results are obtained. This method is depicted in FIG. 4.

Figure 5:
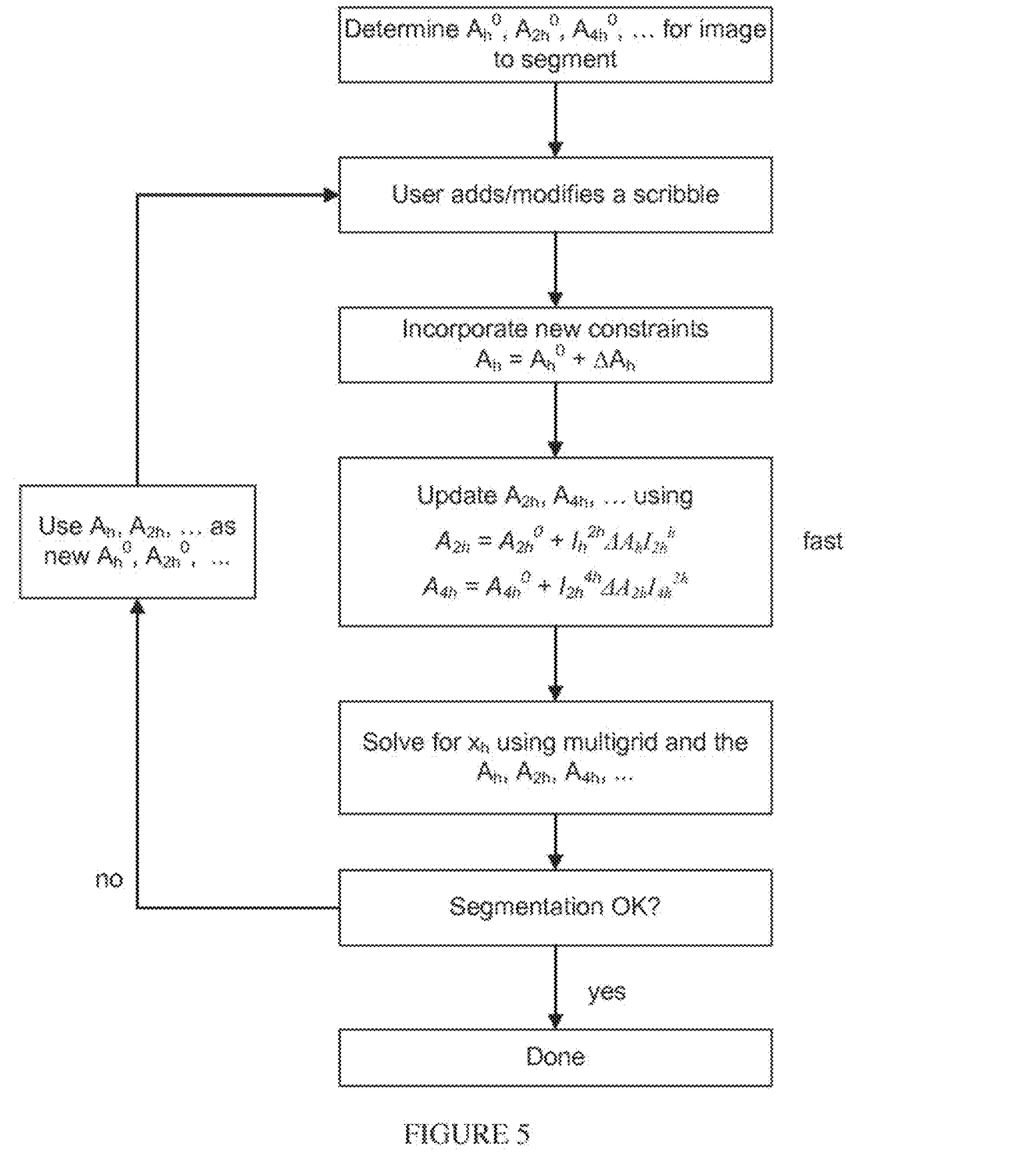
FIG. 5 is a flow chart depicting a method of scribble segmentation using a multigrid technique with patch matrices according to an embodiment of the present invention.

In certain implementations, the coarser levels may be updated without completely re-computing each level, as illustrated in FIG. 5. In one case, use of this approach provided a result approximately 10-20 times faster than without such use, thus providing significantly better interactive response times for the biharmonic scribbles implementation.

A set of unconstrained problems $A_h^0, A_{2h}^0, A_{4h}^0$, and so on are generated as usual. While this initial step may be slow, it is only done once. After the user adds a new scribble, the updated finest problem is defined as $$A_h = A_h^0 + \Delta A_h$$ Equation (13):

where $A_h^0$ is the equation system without additional constraints, $\Delta A_h$ is the patch matrix which contains the changes needed to add the new constraints to $A_h^0$. $A_{2h}$ can then be computed using $$A_{2h} = I_h^{2h} A_h I_{2h}^h = I_h^{2h} A_h^0 I_{2h}^h + I_h^{2h} \Delta A_h I_{2h}^h = A_{2h}^0 + I_h^{2h} \Delta A_h I_{2h}^h$$ Equation (14):

This is much faster to compute since $A_{2h}^0$ has already been computed, and $\Delta A_h$ is much sparser than a regular $A_h$. Defining $$\Delta A_{2h} = I_h^{2h} \Delta A_h I_{2h}^h \quad \text{Equation (15):}$$

the next level can be computed the same way using the following equation $$\Delta A_{4h} = A_{4h}^0 + I_{2h}^{4h} \Delta A_{2h} I_{4h}^{2h} \quad \text{Equation (16):}$$

The selection of the nodes in the coarser grids $\Omega_{2h}, \Omega_{4h}, \ldots$ must be independent of the labeling so that the variables remain the same as for the precomputed problems $A_h^0, A_{2h}^0, \ldots$ If it is necessary to adapt the restrictors or interpolators because of added scribbles, patch matrices can be used for them too in the same way. For example, if the restrictor is adapted (using R instead of $I_h^{2h}$ for the restrictor to get easier syntax) due to $$A_{2h} = (R^0 + \Delta R)(A_h^0 + \Delta A_h) I_{2h}^h$$

added constraints, then $= R^0 A_h^0 I_{2h}^h + R^0 \Delta A_h I_{2h}^h + \Delta R A_h^0 I_{2h}^h + \Delta R \Delta A_h I_{2h}^h$, where again $A_{2h}^0 = A_{2h}^0 + R^0 \Delta A_h I_{2h}^h + \Delta R A_h^0 I_{2h}^h + \Delta R \Delta A_h I_{2h}^h$
is precomputed and the rest involves very sparse matrices so it is quick to compute.

A system for performing the techniques described above may include a register or other volatile or non-volatile storage device that receives and stores image data from one or more imaging devices (e.g., an ultrasound device, CT scanner, MIR device, etc.). The system may also include one or more processors that, based on the image data, uses the techniques described above to create a well-segmented image.

In some embodiments, a display and an associated user interface may also be included, thus allowing a user to add, modify and/or remove scribbles and manipulate the images. The display and user interface can be provided as one integral unit or separate units and may also include various user input devices such as a keyboard and/or mouse or a pointer. The display can be passive (e.g., a "dumb" CRT or LCD screen) or in some cases interactive, facilitating direct user interaction with the images and models through touch-screens (using, for example, the physician's finger as an input device) and/or various other input devices such as a stylus, light pen, or pointer. The display and input devices may be in location different from that of the register and/or processor, thus allowing users to receive, view, and manipulate images in remote locations using, for example, wireless devices, handheld personal data assistants, notebook computers, among others.

In various embodiments the register and/or processor may be provided as either software, hardware, or some combination thereof. For example, the system may be implemented on one or more server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly storage devices.

For embodiments in which the invention is provided as a software program, the program may be written in any one of a number of high level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device using any combinations of CPUs and/or GPUs to allow for increased processing capabilities.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of segmenting a digitized image, the method comprising:
   receiving the digitized image, the digitized image having a plurality of image elements;
   constructing, by a processing circuit, a multigrid hierarchy of matrices having a plurality of levels, each level of the multigrid hierarchy associated with a different resolution of the image elements;
   segmenting, by the processing circuit, the digitized image into at least two visible portions by constraining a first set of constraints associated with a membership value of a subset of the image elements;
   determining, by the processing circuit, an unknown membership value, given the first set of constraints, by solving a linear equation system based on the multigrid hierarchy; and
   updating, with a patch matrix, a coarser level of the multigrid hierarchy to account for a second set of constraints.

2. The method of claim 1, wherein the first set of constraints are derived from a subset of assigned inside labels, outside labels, and edge labels.

3. The method of claim 2, wherein the linear equation system includes either a Laplace or a biharmonic equation.

4. The method of claim 3, wherein the linear equation system that incorporates the second set of constraints is expressed as $A_h = A_h^0 + \Delta A_h$, wherein $A_h^0$ represents the equation system without the second set of constraints, $\Delta A_h$ represents the patch matrix, and the coarser level of the multigrid hierarchy is obtained by the equation $A_{2h} = A_{2h}^0 + I_h^{2h} \Delta A_h I_{2h}^h$, wherein $I_h^{2h}$ is a multigrid restrictor and $I_{2h}^h$ is a multigrid interpolator.

5. The method of claim 2, wherein the patch matrix accounts for the second set of constraints resulting from a new scribble annotation.

6. The method of claim 2, further comprising determining unknown membership values based on the updated multigrid hierarchy.

7. A system for segmenting a digitized image, the system comprising:
   a display for displaying the digitized image;
   a data storage module for receiving the digitized image, the digitized image having a plurality of image elements;
   a user interface; and
   a processing circuit configured to:
      construct a multigrid hierarchy of matrices having a plurality of levels, each level of the multigrid hierarchy associated with a different resolution of the image elements;

segment the digitized image into at least two visible portions by constraining a first set of constraints associated with a membership value of a subset of the image elements;

determine an unknown membership value, given the first set of constraints by solving a linear equation system based on the multigrid hierarchy; and update, with a patch matrix, a coarser level of the multigrid hierarchy to account for a second set of constraints.

8. The system of claim 7, wherein the first set of constraints are derived from a subset of assigned inside labels, outside labels, and edge labels.

9. The system of claim 8, wherein the linear equation system includes either a Laplace or a biharmonic equation.

10. The system of claim 9, wherein the linear equation system that incorporates the second set of constraints is expressed as $A_h = A_h^0 + \Delta A_h$, wherein $A_h^0$ represents the equation system without the second set of constraints, $\Delta A_h$ represents the patch matrix, and the coarser level of the multigrid hierarchy is obtained by the equation $A_{2h} = A_{2h}^0 + I_h^{2h} \Delta A_h I_{2h}^h$, wherein $I_h^{2h}$ is a multigrid restrictor and $I_{2h}^h$ is a multigrid interpolator.

11. A non-transitory computer-readable medium comprising a plurality of instructions for segmenting a digitized image and configured to be executed by a processing circuit to perform the following:

construct a multigrid hierarchy of matrices associated with a plurality of levels, each level of the multigrid hierarchy having a different resolution of the image elements;

segment the digitized image into at least two visible portions by constraining a first set of constraints associated with a membership value u of a subset of the image elements;

determine an unknown membership value, given the first set of constraints by solving a linear equation system based on the multigrid hierarchy; and update, with a patch matrix, a coarser level of the multigrid hierarchy to account for a second set of constraints.

12. The non-transitory computer-readable medium of claim 11, wherein the first set of constraints are derived from a subset of assigned inside labels, outside labels, and edge labels.

13. The non-transitory computer-readable medium of claim 12, wherein the linear equation system includes either a Laplace or a biharmonic equation.

14. The non-transitory computer-readable medium of claim 13, wherein the linear equation system that incorporates the second set of constraints is expressed as $A_h = A_h^0 + \Delta A_h$, wherein $A_h^0$ represents the equation system without the second set of constraints, $\Delta A_h$ represents the patch matrix, and the coarser level of the multigrid hierarchy is obtained by the equation $A_{2h} = A_{2h}^0 + I_h^{2h} \Delta A_h I_{2h}^h$, wherein $I_h^{2h}$ is a multigrid restrictor and $I_{2h}^h$ is a multigrid interpolator.

* * * * *